US012481246B2

(12) United States Patent
Vorpe et al.

(10) Patent No.: US 12,481,246 B2
(45) Date of Patent: Nov. 25, 2025

(54) BARREL FOR TIMEPIECE

(71) Applicant: Nivarox-FAR S.A., Le Locle (CH)

(72) Inventors: Gerard Vorpe, Le Locle (CH); Laurent Jeanneret, Villers-le-lac (FR); Pierre Cusin, Villars-Burquin (CH)

(73) Assignee: NIVAROX-FAR S.A., Le Locle (CH)

( * ) Notice: Subject to any disclaimer, the term of this patent is extended or adjusted under 35 U.S.C. 154(b) by 478 days.

(21) Appl. No.: 17/970,193

(22) Filed: Oct. 20, 2022

(65) Prior Publication Data

US 2023/0205135 A1 Jun. 29, 2023

(30) Foreign Application Priority Data

Dec. 29, 2021 (EP) .................................. 21218134.1

(51) Int. Cl.
*G04B 5/24* (2006.01)
*G04B 1/16* (2006.01)

(52) U.S. Cl.
CPC ................. *G04B 5/24* (2013.01); *G04B 1/16* (2013.01)

(58) Field of Classification Search
None
See application file for complete search history.

(56) References Cited

FOREIGN PATENT DOCUMENTS

| | | | | | |
|---|---|---|---|---|---|
| CH | 343 889 | A | | 12/1959 | |
| CH | 690696 | A5 | * | 12/2000 | G04B 1/16 |
| CH | 704576 | A2 | * | 9/2012 | G04B 1/145 |
| CH | 708660 | A1 | * | 4/2015 | G04B 5/24 |
| EP | 3608727 | A1 | * | 2/2020 | G04B 15/14 |
| JP | 50-142472 | U | | 5/1974 | |
| JP | 2016-090313 | A | | 5/2016 | |
| JP | 2017-156309 | A | | 9/2017 | |
| WO | 2015/049165 | A1 | | 4/2015 | |

OTHER PUBLICATIONS

Combined machine translation of CH 690696. (Year: 2025).*
Combined machine translation of CH 704576. (Year: 2025).*
Combined machine translation of CH 708660. (Year: 2025).*
Combined machine translation of EP 3608727. (Year: 2025).*
European Search Report for 21 21 8134 dated, Jun. 9, 2022.

* cited by examiner

*Primary Examiner* — Regis J Betsch
*Assistant Examiner* — Michael James Walker
(74) *Attorney, Agent, or Firm* — Sughrue Mion, PLLC

(57) ABSTRACT

A barrel (1) for self-winding timepiece including a drum (11) provided with an inner lateral wall (12) and a mainspring (2) forming a winding including an outer coil (21) the end (22) of which is friction coupled with the inner lateral wall and free to slip against the inner lateral wall in the event of overtension of the mainspring (2). The end of the outer coil includes an external face (23) having two friction surfaces (24, 25) disposed in the top and bottom portion of the outer coil and arranged to be in contact with the inner lateral wall in such a way that the portion between the friction surfaces, referred to as central portion (26), is not in contact with the inner lateral wall, the central portion forming a reservoir (27) for a lubricant between the two friction surfaces.

6 Claims, 2 Drawing Sheets

BARREL FOR TIMEPIECE

TECHNICAL FIELD OF THE INVENTION

The present invention pertains to the field of horology. More specifically, it relates to a barrel intended to equip a self-winding timepiece. It also relates to a timepiece equipped with such a barrel.

TECHNOLOGICAL BACKGROUND

Barrels for self-winding timepieces conventionally include a drum wherein is housed a mainspring spirally coiled about a barrel arbor. To prevent any overtension of the mainspring, which could make it give way or damage the train of the self-winding device, the mainspring is not fixed to the lateral wall of the drum, but friction coupled, by means of its last coil, with the aid of an elastic strip called slip spring. The friction coupling between the mainspring and the lateral wall of the drum must be calculated in order that beyond a determined maximum drive torque, the last coil slips along said wall and thus reduces the tension of the mainspring. The surface state of the inner lateral wall of the drum as well as its lubrication are factors that greatly influence the operation of this friction coupling. Another determining factor relates to the geometry of the inner lateral wall.

According to the prior art, the inner lateral wall of the drum includes friction surfaces against which the end of the mainspring comes to rub, which wears out the wall of the drum. To remedy this problem, a lubricant such as grease is deposited on the inner lateral wall of the drum.

However, the problem of wear is always present, it amplifies over time and may lead to significant damage, malfunctions or even breakage of a part. Indeed, the friction of the end of the last coil of the mainspring tends to scrape off and push back the grease on the upper and lower rims of the drum. Ultimately, the end of the outer coil of the spring tears off fine particles from the wall of the drum, and they make the friction even more abrasive, which produces even more particles and accelerates the wear phenomenon. Overtime, the friction coupling between the mainspring and the lateral wall of the barrel may be seriously affected.

Thus, a dismantling of the barrel and an addition of grease remains necessary to maintain satisfactory operating conditions.

One aim of the present invention is consequently to propose a barrel making it possible to remedy this wear problem.

SUMMARY OF THE INVENTION

The invention resolves the aforementioned drawbacks by proposing a barrel comprising a mainspring the outer coil of which comprises a configuration arranging two friction surfaces disposed in the top and bottom portion of the outer coil, the friction surfaces being arranged to be in contact with the inner lateral wall of the barrel drum.

To this end, the present invention relates to a barrel for self-winding timepiece comprising a drum of axis AA provided with an inner lateral wall and a mainspring forming a winding including an outer coil the end of which is friction coupled with said inner lateral wall and free to slip against the inner lateral wall in the event of overtension of the mainspring.

According to the invention, the end of said outer coil comprises an external face having two friction surfaces disposed in the top and bottom portion of the outer coil and arranged to be in contact with the inner lateral wall in such a way that the portion between the friction surfaces, referred to as central portion, is not in contact with the inner lateral wall, said central portion forming a reservoir for a lubricant between the two friction surfaces and making it possible to channel the lubricant to the centre of the outer coil.

In accordance with other advantageous variants of the invention:

- the friction surfaces are in the form of localised over-thicknesses in the top and bottom portion of the outer coil;
- the friction surfaces are formed by removing material, on one portion of the thickness of the outer coil or on the entire thickness, at the middle portion of the outer coil;
- the friction surfaces extend along the length of the outer coil;
- the thickness of the material removal varies increasingly from the end of the outer coil and along the length of the outer coil;
- the material removal is in the form of a funnel, of a neck, of a parabola or of a semi-circle or any other geometry capable of channelling the grease to the centre of the friction track of the strip against the drum.

The invention also relates to a horological movement comprising a barrel in accordance with the invention.

The invention also relates to a watch comprising a movement equipped with a barrel according to the invention.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION OF THE INVENTION

A barrel in accordance with the invention will now be described in the following making reference jointly to FIGS. 1, 2 and 3*a* to 3*d*.

Figure 1:
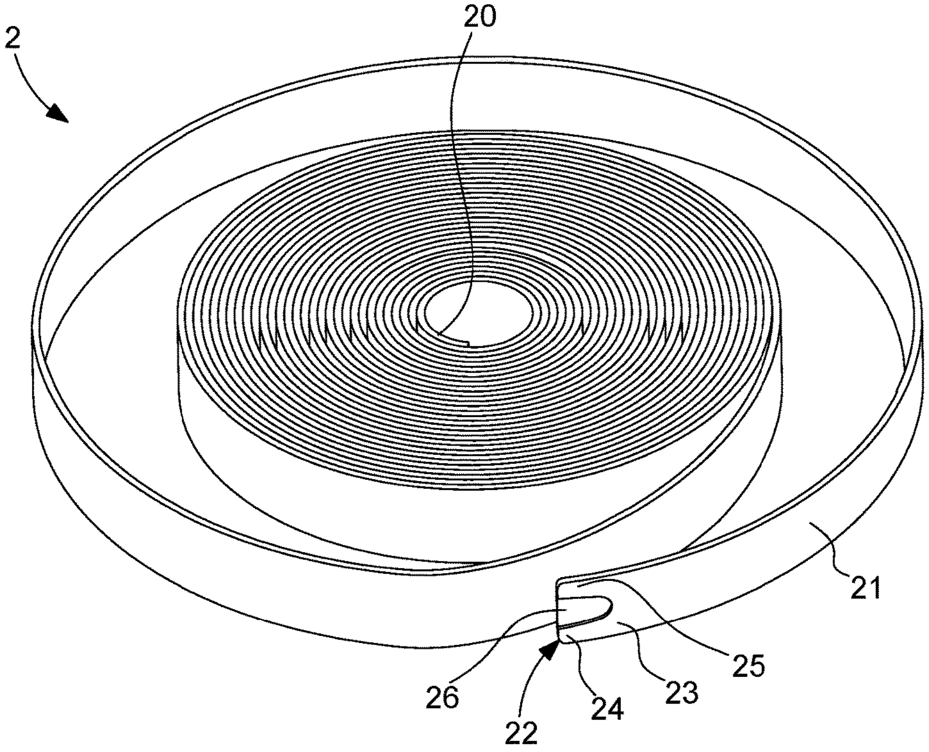
FIG. 1 is a perspective view of a barrel for a self-winding timepiece.
Figure 2:
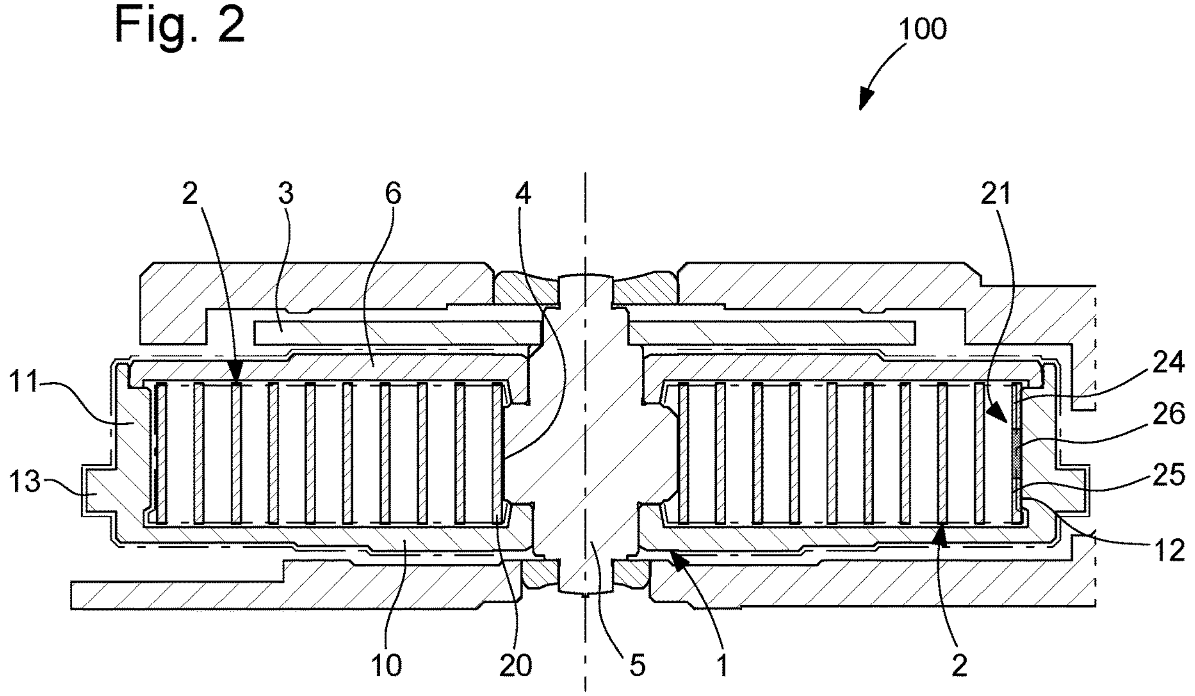
FIG. 2 is a cross-sectional view of the drive organ for the self-winding timepiece.

As illustrated in FIG. 2, the barrel 1 for self-winding horological movement comprises a back 10 integral with a drum 11 of axis AA. A mainspring 2, also illustrated in FIG. 1, is coiled inside the barrel 1, the inner coil 20 of the mainspring 2 being coupled to a core 4 disposed around an arbor 5, and the outer coil 20 of the spring 2 being in contact with the inner lateral wall 12 of the drum 11.

The spring 2 may be produced in one-piece and be in the form of a strip. The spring may thus be mounted on the core 4 around the arbor 5 of the barrel.

The outer coil 21 has an end 22 friction coupled with the inner lateral wall 12 and free to slip against the inner lateral wall 12 in the event of overtension of the mainspring 2.

As can be observed in FIG. 2, the drive organ 100 has a barrel 1 that includes a cylindrical drum 11 wherein is housed the spring 2, a barrel arbor 5 and a core 4 whereon is fixed the inner coil 20 of the spring 2, and a cover 6 that closes the drum 11.

The drum 4 also includes an outer toothing 13 that meshes with a pinion of a motion-work train (not shown).

According to the invention, the end 22 of the outer coil 21 comprises an external face 23 having two friction surfaces 24, 25 disposed in the top and bottom portion of the outer coil 21 and arranged to be in contact with the inner lateral wall 12 in such a way that the portion between the friction surfaces 24, 25, referred to as central portion 26, is not in contact with the inner lateral wall 12.

Advantageously, the central portion 26 forms a reservoir for a lubricant, the reservoir then being at least partially between the two friction surfaces 24, 25.

As illustrated, the friction surfaces 24 and 25 are formed by removing material, on one portion of the thickness of the outer coil 21 or on the entire thickness, at the middle portion 26. This material removal makes it possible for the friction surfaces 24 and 25 to be in contact with the inner lateral wall 12 of the drum, the lubricant being brought towards the centre thanks to the material removal when the outer coil 21 slips against the drum.

According to another embodiment of the invention, the friction surfaces 24, 25 are in the form of localised over-thicknesses on the top and bottom portions of the outer coil 21, the overthicknesses thus alone being in contact with the inner lateral wall 12 of the drum and forming a reservoir for a lubricant at the middle portion of the outer coil 21.

The friction surfaces 24, 25 extend along the length of the outer coil 21, the length obviously being able to vary depending on the needs of the person skilled in the art. It is also obvious that the friction surfaces 24, 25 do not extend over the entire length of the outer coil 21 so as not to make it fragile or make it too rigid, which would also be detrimental to the correct operation of the barrel.

Figure 3A:
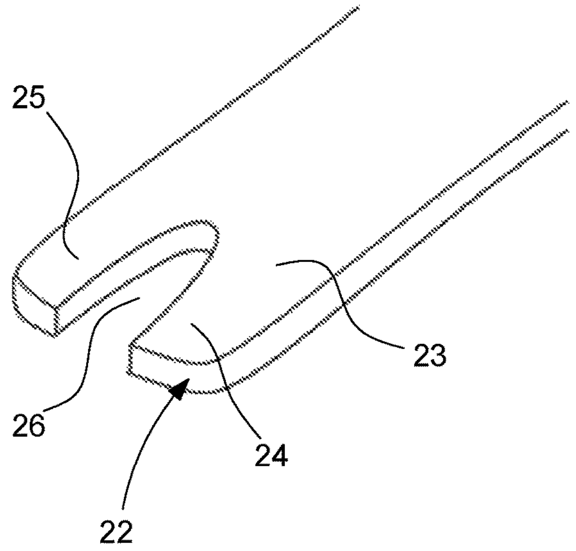
FIG. 3*a* through 3*d* show various embodiments regarding the design of the end of the outer coil.
Figure 3B:
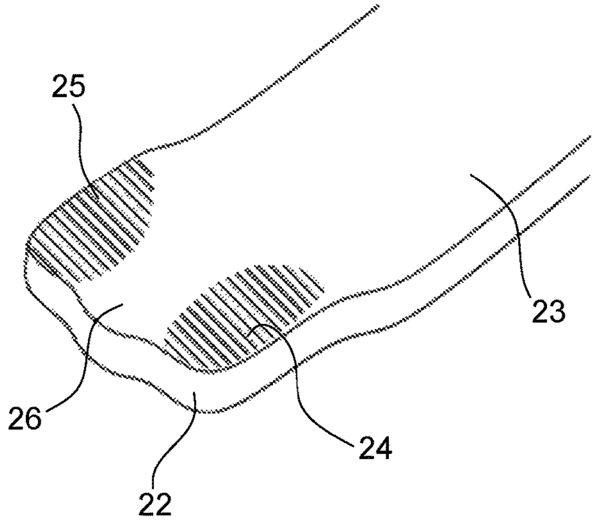
Figure 3C:
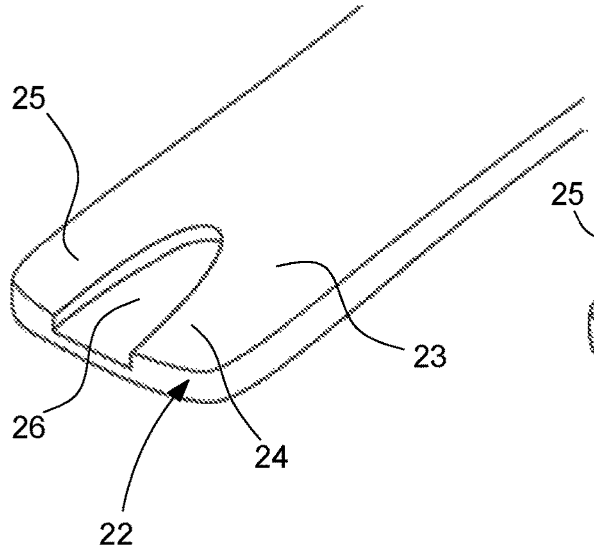
Figure 3D:
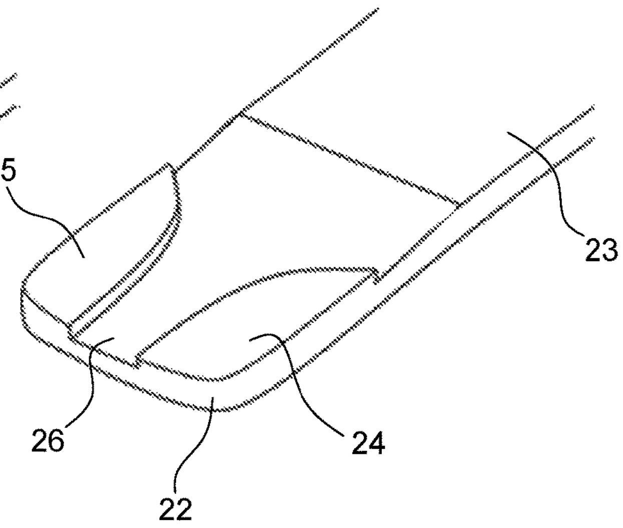

According to one embodiment illustrated in FIG. 3*d*, the thickness of the material removal varies increasingly from the end of the outer coil 21 and along the length of the outer coil. The material removal is in the form of a funnel, of a neck, of a parabola or of a semi-circle for example, in such a way as to form a reservoir for the lubricant and to guide it towards the centre of the inner lateral wall of the drum.

Also according to another embodiment illustrated in FIG. 3*b*, the end 22 of the outer coil 21 is deformed at its external face 23 in such a way as to form the two friction surfaces 24, 25. Such a deformation of the outer coil 21 is obtained, for example, by stamping.

In addition, such an arrangement of the end of the outer coil makes it possible to homogeneously distribute the lubricant from the start of the operation of the barrel, and subsequently makes it possible to channel the lubricant to the centre of the outer coil.

The invention also relates to a horological movement as well as a timepiece equipped with a barrel in accordance with the invention.

Thanks to these various aspects of the invention, we have a barrel making it possible to reduce the wear caused by the friction of the spring on the barrel drum.

Of course, the present invention is not limited to the example illustrated and is susceptible to various variants and modifications that will become apparent to the person skilled in the art.

The invention claimed is:

1. A barrel for self-winding timepiece, comprising:

a drum provided with an inner lateral wall, and a mainspring forming a winding including an outer coil the end of which is friction coupled with said inner lateral wall and free to slip against the inner lateral wall in the event of overtension of the mainspring, wherein the end of said outer coil comprises an external face having two friction surfaces disposed in the top and bottom portion of the outer coil and arranged to be in contact with the inner lateral wall in such a way that a central portion between the friction surfaces is not in contact with the inner lateral wall, said central portion forming a reservoir for a lubricant between the two friction surfaces.

2. The barrel according to claim 1, wherein the friction surfaces are formed by removing material, on one portion of the thickness of the outer coil or on the entire thickness, at the central portion of the outer coil.

3. The barrel according to claim 2, wherein the removal of material is in the form of a funnel, of a neck, of a parabola or of a semi-circle.

4. A movement comprising a barrel according to claim 1.

5. A timepiece comprising a barrel according to claim 1.

6. A timepiece comprising a movement according to claim 4.

* * * * *